Sept. 6, 1927.  E. D. TILLYER  1,641,790

MULTIFOCAL LENS

Filed Oct. 20, 1924

INVENTOR
Edgar D. Tillyer.
BY Harry H. Styll
ATTORNEY

Patented Sept. 6, 1927.

1,641,790

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

MULTIFOCAL LENS.

Application filed October 20, 1924. Serial No. 744,781.

This invention relates to improvements in ophthalmic lenses and has particular reference to the provisions of a multifocal lens formed of two pieces of material. Prior to my invention a number of attempts have been made to produce trifocal lenses by inserting two segments into a major blank, each of the segments having a different refractive index. In such cases, the additions for the reading and intermediate portions have been obtained through the effect of the combination of the different refractive indices.

One of the principal objects of this invention is the provision of a trifocal lens which is formed of two pieces of material.

Another object of the invention is to provide such a trifocal lens wherein the segment is inserted in the major blank, a portion of its outer surface being continuous with that of the blank and the remainder having a different curve.

Another object is to provide a blank for the formation of such lenses from which a plurality of finished lenses may be produced.

Other objects and advantages should be apparent from the following description taken in connection with the accompanying drawings, wherein Figure 1 is an elevation of a finished lens embodying the invention.

Similar reference characters designate corresponding parts throughout the several views.

Figure 1:
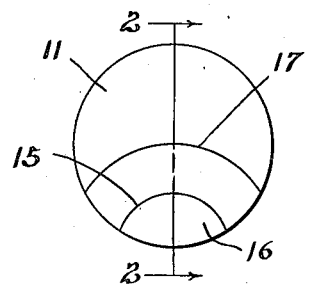
Figure 2:
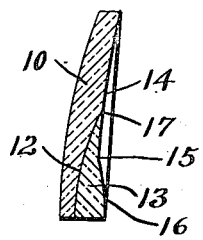
Figure 2 is a sectional view on the line 2—2 of Figure 1.
Figure 3:
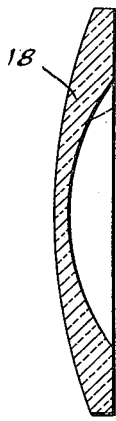
Figure 3 is a sectional view through a partly finished blank.
Figure 4:
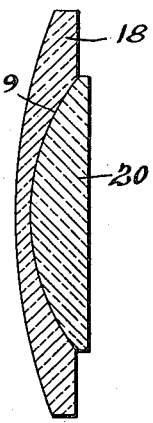
Figure 4 is a similar view illustrating the next step in the production of the blank.
Figure 5:
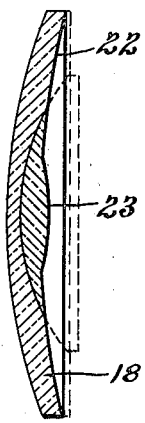
Figure 5 is a similar view through the finished blank.
Figure 6:
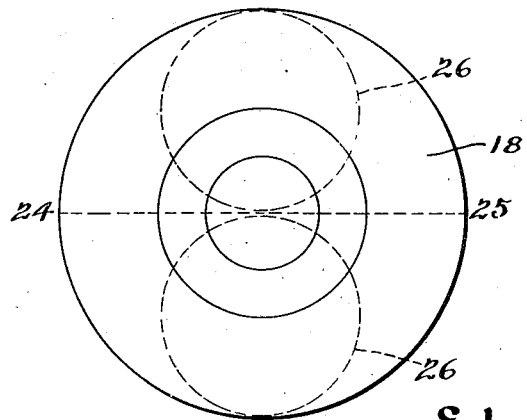
Figure 6 is an elevation of said finished blank.

In Figures 1 and 2 an ophthalmic lens embodying the present invention has been illustrated. The reference character 10 designates the main portion of the blank, the upper portion 11 of which is suitably ground to provide a distance vision field. The member 10 is recessed upon one of its surfaces as at 12 and secured within the recess is a minor portion or what is commonly known as a segment 13. The two pieces 10 and 13 are each of a different refractive index, for example, the major portion 10 may preferably be formed of crown glass while the segment 13 may be formed of flint glass, as is well known in ordinary fused bifocal lens practice. The segment side 14 of the major portion and an adjacent portion of the segment 13 are ground to a continuous curve, starting preferably from the upper surface and continuing to a line such as is indicated by the reference character 15. The remaining portion of the insert 13 is ground to a different curvature 16 suitably calculated to give a stronger optical power than the remainder of the lens. From this, it will be seen that three different optical powers have been formed, the largest portion being the weakest of the three, a second intermediate field being defined by the extreme edge 17 of the segment and by the line 15 previously pointed out. The optical addition of this intermediate field is formed by the bottom curvature 12 and a combination of the two different refractive indices at that point. In view of the fact that the surface curve 16 is ground stronger than the continuous curve 14, a reading portion is produced on the lower part of the segment.

Referring now to Figures 3, 4, 5, and 6, a practical process of manufacture is illustrated step by step for the production of an improved bifocal lens of the above character. The circular blank 18 of crown glass is provided on one of its surfaces with a ground and polished spherical recess 19, while the segment 20 having a ground and polished surface 21 of the same degree of curvature as the recess 19 is also produced. The segment 20 is then secured within the recess 19 either by cement or fusing, the latter being the preferable way of doing it. After the segment is thus secured in the blank, the blank is mounted in a lens grinding machine and surfaced to the curves 22 and 23, respectively, the central curvature 23 being of a shorter radius than the curvature 22 and occupying only a portion of the total area of the segment. The blank 18 may then be cut upon the diametric line 24—25 from each of which sections a finished lens may be cut as indicated by the dotted lines 26.

The method of forming and uniting the button 20 and the recessed blank 18 is the same as is known to those skilled in the art for producing regular fused bifocals. After the button 20 is secured within the recess 19 the two curves 22 and 23 may be produced upon machinery such as has been used for forming ordinary onepiece bifocals in target formation. Ordinarily such machines embody a spindle which may be set to a desired angle and adapted to rotate an annular abrading tool upon the lens surface while the blank itself is rotated on another spindle. The two curves 22 and 23 may be produced simultaneously or each in a separate operation as desired.

From the foregoing it will be evident that an improved trifocal lens has been produced wherein an intermediate vision field is disposed between the distance field and the reading field. The construction is such that the appearance will not be ungainly and it may be economically produced. If the segment 20 is fused within the blank 18 there is no possibility of its coming loose and because of the fact that the two surfaces 22 and 23 are merged there will be no shoulder to break off or form a markedly noticeable line of joinder between the two fields.

Obviously, changes may be made in the minor details and arrangements of the parts and the right is herein reserved to make such changes falling within the scope of the appended claims without departing from the spirit of the invention.

Having thus described the invention, what is claimed is:—

1. A multifocal lens comprising a focal field of a single piece of glass having a distance curvature on the multifocal side thereof, a second focal field comprised of a separate piece of glass of different index of refraction from the first piece of glass superimposed on the first piece of glass and having the same surface curvature on the multifocal side thereof as the first piece of glass, and a third focal field composed of the said two pieces of glass but having a different surface curvature on the said multifocal side from that of the other fields.

2. A multifocal lens comprising a focal field of a single piece of glass having a curvature on the multifocal side thereof, a second field comprised of a separate piece of glass of a different index of refraction from the first piece of glass superimposed on the first piece of glass and having the same surface curvature on the multifocal side thereof as the first piece of glass, a third field composed of the said two pieces of glass but having a different surface curvature on the said multifocal side from that of the other fields and a curvature on the side opposite the multifocal side adapted to give the required prescription value to each of the said focal fields.

EDGAR D. TILLYER.